United States Patent
Abe

(10) Patent No.: US 8,932,120 B1
(45) Date of Patent: Jan. 13, 2015

(54) GAME MANAGEMENT SERVER APPARATUS

(71) Applicant: DeNA Co., Ltd., Tokyo (JP)

(72) Inventor: Yuuki Abe, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/044,967

(22) Filed: Oct. 3, 2013

(30) Foreign Application Priority Data

Aug. 15, 2013 (JP) ................................. 2013-168807

(51) Int. Cl.
  A63F 9/24 (2006.01)
  A63F 13/00 (2014.01)
  A63F 13/30 (2014.01)

(52) U.S. Cl.
  CPC ............ *A63F 13/12* (2013.01); *A63F 2300/57* (2013.01); *A63F 2300/572* (2013.01); *A63F 2300/305* (2013.01); *A63F 2300/306* (2013.01)
  USPC ..................................... 463/8; 463/9; 463/31

(58) Field of Classification Search
  CPC .................... A63F 2300/305; A63F 2300/307; A63F 2300/572; A63F 2300/5533
  USPC ....................................................... 463/8, 31
  See application file for complete search history.

(56) References Cited

U.S. PATENT DOCUMENTS

| | | | |
|---|---|---|---|
| 7,500,916 B2 * | 3/2009 | Lieberman et al. | 463/31 |
| 7,559,834 B1 * | 7/2009 | York | 463/2 |
| 8,038,535 B2 * | 10/2011 | Jensen | 463/42 |
| 8,042,045 B1 * | 10/2011 | Sullivan et al. | 715/708 |
| 8,651,961 B2 * | 2/2014 | Muller | 463/42 |
| 2003/0216177 A1 * | 11/2003 | Aonuma et al. | 463/32 |
| 2004/0087363 A1 * | 5/2004 | Bogenn | 463/29 |
| 2004/0259634 A1 * | 12/2004 | Machida | 463/29 |
| 2005/0245317 A1 * | 11/2005 | Arthur et al. | 463/42 |
| 2006/0100020 A1 | 5/2006 | Kasai | |
| 2007/0218966 A1 * | 9/2007 | Tilston et al. | 463/5 |
| 2009/0075738 A1 * | 3/2009 | Pearce | 463/42 |
| 2009/0209337 A1 * | 8/2009 | Vrignaud et al. | 463/31 |
| 2010/0304806 A1 * | 12/2010 | Coleman et al. | 463/2 |
| 2012/0015741 A1 * | 1/2012 | Craine et al. | 463/42 |
| 2012/0021840 A1 * | 1/2012 | Johnson et al. | 463/43 |
| 2012/0108344 A1 * | 5/2012 | Fujisawa et al. | 463/42 |
| 2012/0142429 A1 * | 6/2012 | Muller | 463/42 |
| 2013/0005471 A1 * | 1/2013 | Chung et al. | 463/42 |
| 2013/0059634 A1 * | 3/2013 | Behmaram-Mosavat et al. | 463/9 |
| 2013/0337916 A1 * | 12/2013 | Saretto et al. | 463/32 |
| 2014/0011595 A1 * | 1/2014 | Muller | 463/42 |
| 2014/0100040 A1 * | 4/2014 | Chung et al. | 463/42 |

FOREIGN PATENT DOCUMENTS

JP 2006-136350 6/2006

* cited by examiner

*Primary Examiner* — Steven J Hylinski
(74) *Attorney, Agent, or Firm* — IPUSA, PLLC

(57) ABSTRACT

A game management server apparatus that provides, to terminal devices connected via a network, a game service in which players operating the terminal devices cooperate with each other to battle against an enemy, includes, a storing unit storing a battle history of a player; a generating unit generating strategy guide information for conquering an opposing enemy; an attacking screen information generating unit generating attacking screen information including the battle history and the strategy guide information; a communication screen information generating unit generating communication screen information for a plurality of players to have communication with each other; and a screen information sending unit sending the attacking screen information and the communication screen information to the terminal devices, wherein the attacking screen information generating unit generates attacking screen information in which display of the battle history and the strategy guide information are terminated when a predetermined condition is satisfied.

7 Claims, 9 Drawing Sheets

FIG.5

| EVENT CONDITION (STATUS, TIME ZONE, PARTY ATTRIBUTION, ...) | EVENT CONTENT (SCREEN DISPLAY CONDITION/ DISPLAY CONTENT, PARAMETER UPDATING CONDITION/UPDATING CONTENT, ...) | ... |
|---|---|---|

FIG.6

| PARTY ID | PARTY NAME | OBTAINED POINT | COMBO NUMBER | LAST COMBO DATE/ TIME | LAST COMBO PLAYER ID | LOG DATA (PLAYER ID, DATE/TIME, ATTACKING TYPE, OPPOSING PARTY ID, DAMAGE, ...) | ... |
|---|---|---|---|---|---|---|---|

FIG.10

| | |
|---|---|
| before battle | Who can participate next time? |
| before battle | How many fighters and sorcerers? |
| before battle | Let's attack first! |
| before battle | I'll be fighter! |
| before battle | Let's defend first! |
| before battle | Let's use all attack first because defend of opponent is low! |
| before battle | I'll raise if we are unable to attack! |
| before battle | When shall we activate blind? |
| before battle | When shall we activate combo boost? |
| before battle | Who still has blind? |
| before battle | Who still has combo boost? |
| before battle | Let's spurt from about 40 minutes because they may activate blind. |
| before battle | Let's spurt from 50 minutes if blind is activated because we can communicate with each other. |
| before battle | Let's wipe out opponent first. |
| before battle | What time shall we start battle today? |
| during battle | I'll raise first. |
| during battle | Don't raise and wait for end of opponent's combo. |
| during battle | nice XX! |
| during battle | I'll activate combo boost again, follow me fighters! |
| during battle | Let's concentrate on attacking sorcerers. |
| during battle | We have enough parameters, let's concentrate on attack! |
| during battle | I'll attack all, please follow me. |
| after battle | Good job! |
| after battle | We got xx combos, great! |
| after battle | Let's increase sorcerers next. |
| after battle | Let's spurt earlier next. |
| after battle | Let's communicate more when blind is activated! |

GAME MANAGEMENT SERVER APPARATUS

CROSS-REFERENCE TO RELATED APPLICATION

The present application is based on and claims the benefit of priority of Japanese Priority Application No. 2013-168807 filed on Aug. 15, 2013, the entire contents of which are hereby incorporated by reference.

BACKGROUND OF THE INVENTION

1. Field of the Invention

The present invention relates to a technique of controlling a network game.

2. Description of the Related Art

Conventionally, in a game in which players cooperate with each other to battle against an enemy, in order to promote cooperative playing by the players of the players a so-called "combo" function exists, for example. A "combo" means that an attacking effect is increased (an ability value is increased, a damage to the opponent is increased, or the like) when ally players continuously attack the enemy within a predetermined period. For example, at the "combo" status, the ability value increases more than usual in accordance with the number of times, or the like, of the successive attacks by the ally players. Thus, the ally players cooperate with each other to attack in order not miss the chance.

With such a function of the cooperative playing by the players, players are motivated to cooperate with other players to play the game on-line in real time. For example, Japanese Laid-open Patent Publication No. 2006-136350 discloses a technique in which information is exchanged by chats or the like between game terminal devices of members in the same team.

As described above, in the conventional game, players may be motivated to cooperate with other players by the function of the cooperative playing by the players such as the "combo" or the like. However, it was not enough for increasing bonding between the players because once the players are on-line, players can obtain results in the game just by simply processing the game in accordance with a predetermined rule based on information of other players displayed in screens.

Japanese Laid-open Patent Publication No. 2006-136350 does not disclose a mechanism by which players are motivated to take initiative to have communications with each other.

SUMMARY OF THE INVENTION

The present invention is made in light of the above problems, and provides a technique to activate communications between players.

According to an embodiment, there is provided a game management server apparatus that provides, to a plurality of terminal devices connected via a network, a game service in which a plurality of players operating the terminal devices cooperate with each other to battle against an enemy, including: a storing unit that stores a battle history of a player; a generating unit that generates strategy guide information for conquering an opposing enemy; an attacking screen information generating unit that generates attacking screen information including the battle history and the strategy guide information; a communication screen information generating unit that generates communication screen information for a plurality of players to have communication with each other; and a screen information sending unit that sends the attacking screen information and the communication screen information to the terminal devices, wherein the attacking screen information generating unit generates attacking screen information in which display of the battle history and the strategy guide information are terminated when a predetermined condition is satisfied.

BRIEF DESCRIPTION OF THE DRAWINGS

Other objects, features and advantages of the present invention will become more apparent from the following detailed description when read in conjunction with the accompanying drawings.

FIG. 5 is a view illustrating an example of a data structure of scenario information;

FIG. 6 is a view illustrating an example of a data structure of party information;

FIG. 10 is a view illustrating an example of communications performed between players.

DETAILED DESCRIPTION OF THE PREFERRED EMBODIMENTS

Figure 1:
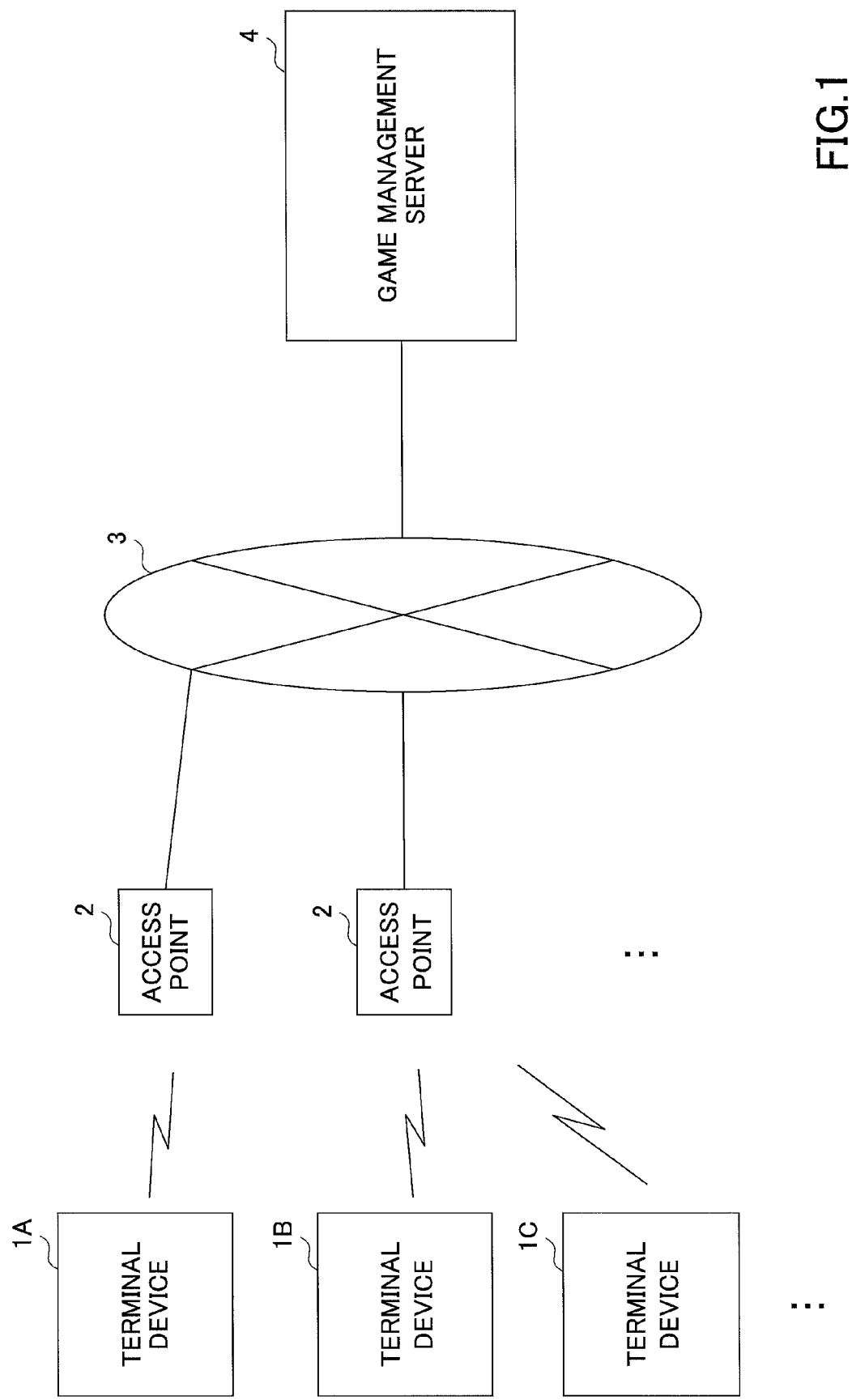
FIG. 1 is a view illustrating an example of a system structure of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(Structure)

FIG. 1 is a view illustrating an example of a system structure of the embodiment.

In FIG. 1, the system includes terminal devices (player terminals) 1A, 1B, 1C, ... possessed by players (users) such as a smartphone, a mobile phone or the like, access points 2 such as a mobile station, a Wi-Fi station or the like, a network 3 such as INTERNET or the like and a game management server 4 that manages (controls) a game in which a plurality of players play a game via the network.

Figure 2:
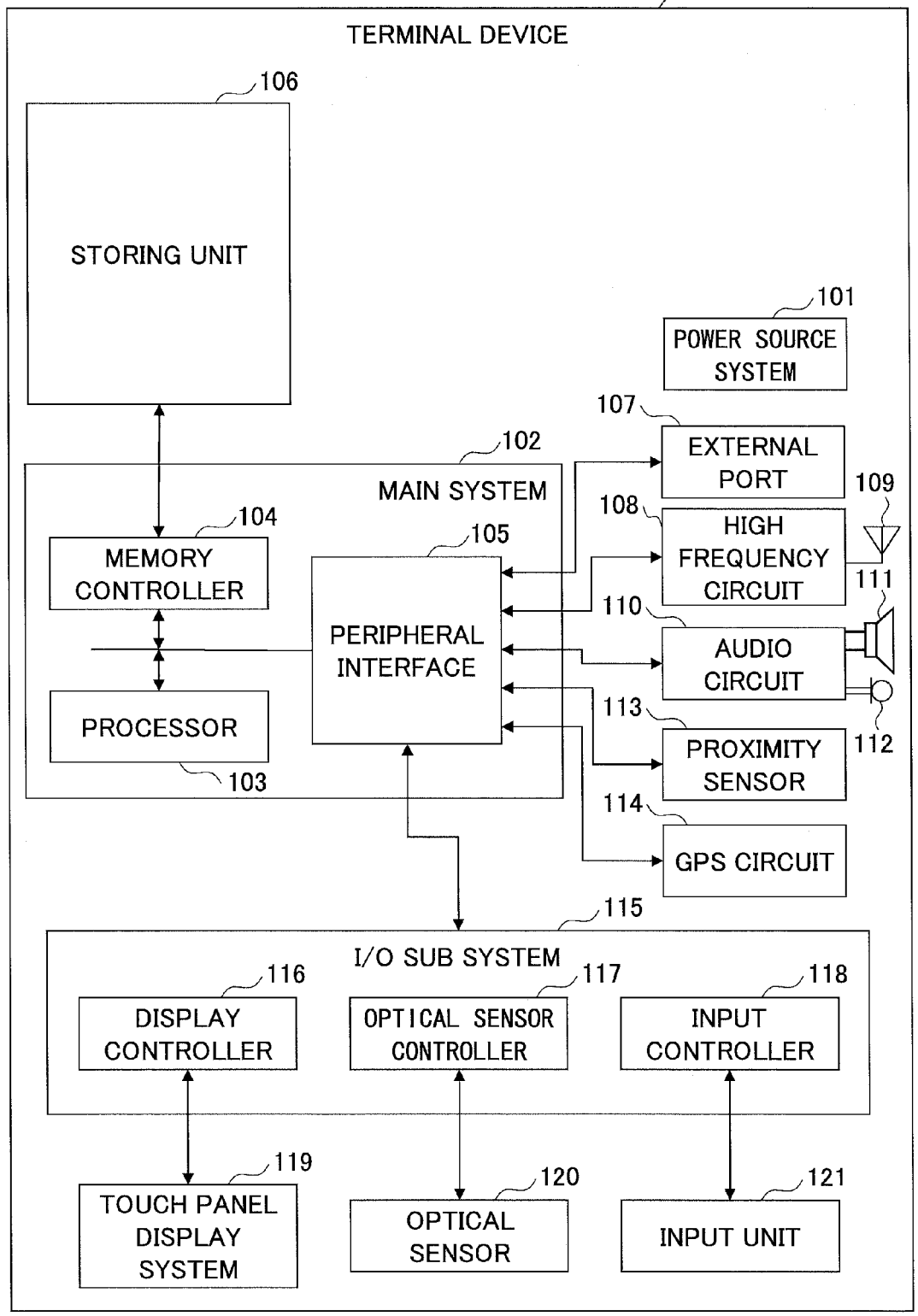
FIG. 2 is a view illustrating an example of a hardware structure of a terminal device.

FIG. 2 is a view illustrating an example of a hardware structure of the terminal device 1 (1A, 1B, 1C, ... ).

In FIG. 2, the terminal device 1 includes a power source system 101, a main system 102 including a processor 103, a memory controller 104 and a peripheral interface 105, a storing unit 106, an external port 107, a high frequency circuit 108, an antenna 109, an audio circuit 110, a speaker 111, a microphone 112, a proximity sensor 113, a GPS (Global Positioning System) circuit 114, an I/O (Input/Output) sub system 115 including a display controller 116, an optical sensor controller 117 and an input controller 118, a touch panel display system 119, an optical sensor 120 and an input unit 121.

Figure 3:
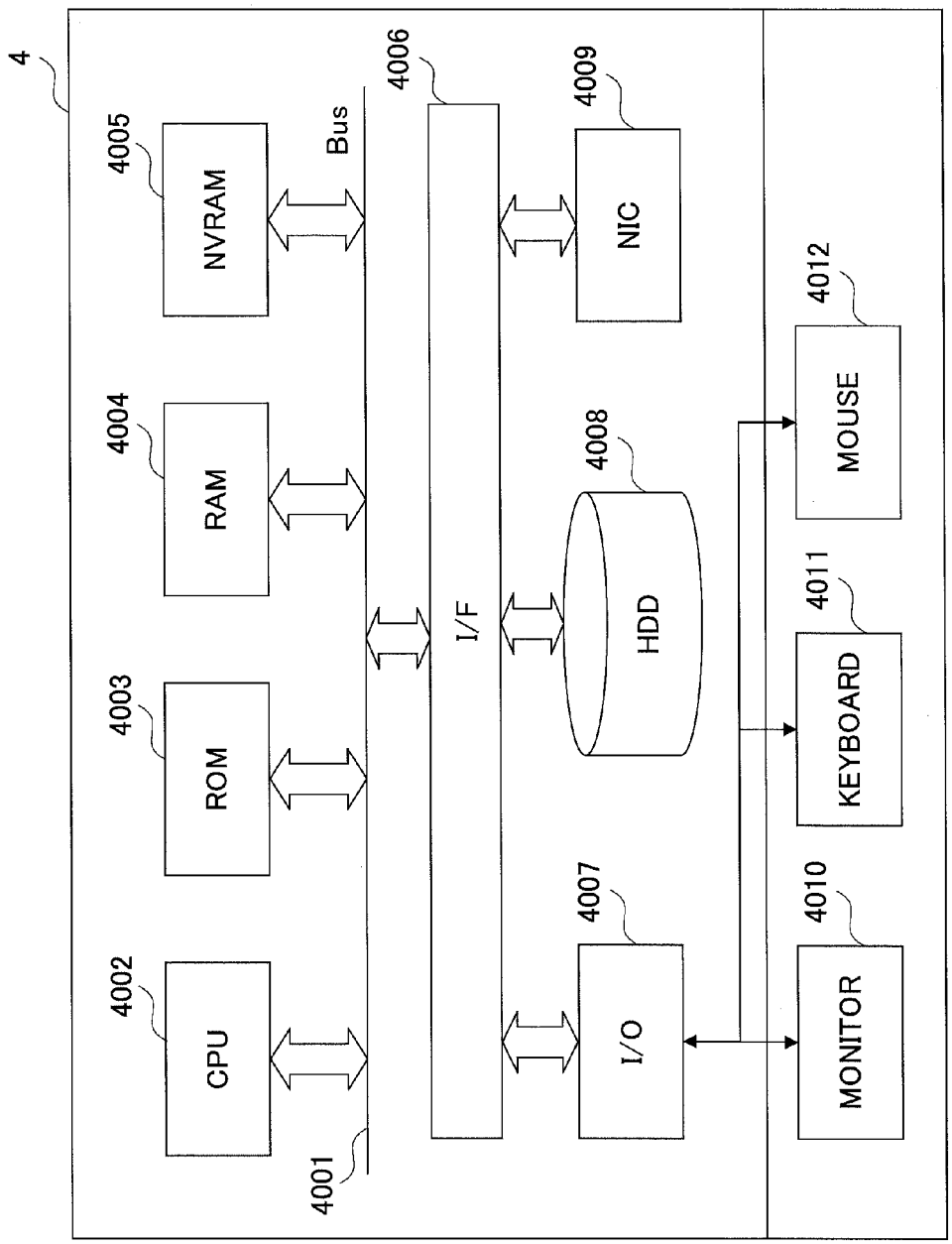
FIG. 3 is a view illustrating an example of a hardware structure of a game management server.

FIG. 3 is a view illustrating an example of a hardware structure of the game management server 4.

In FIG. 3, the game management server 4 includes a CPU (Central Processing Unit) 4002, a ROM (Read Only Memory) 4003, a RAM (Random Access Memory) 4004, an NVRAM (Non-Volatile Random Access Memory) 4005 and an I/F (Interface) 4006 connected to a system bus 4001, an I/O (Input/Output Device) 4007 for a keyboard, a mouse, a monitor, a CD/DVD (Compact Disk/Digital Versatile Disk) drive or the like, an HDD (Hard Disk Drive) 4008 and an NIC (Network Interface Card) 4009 connected to the I/F 4006, a monitor 4010, a game progression control unit 411, a strategy guide information generation unit 412 and the like.

Figure 4:
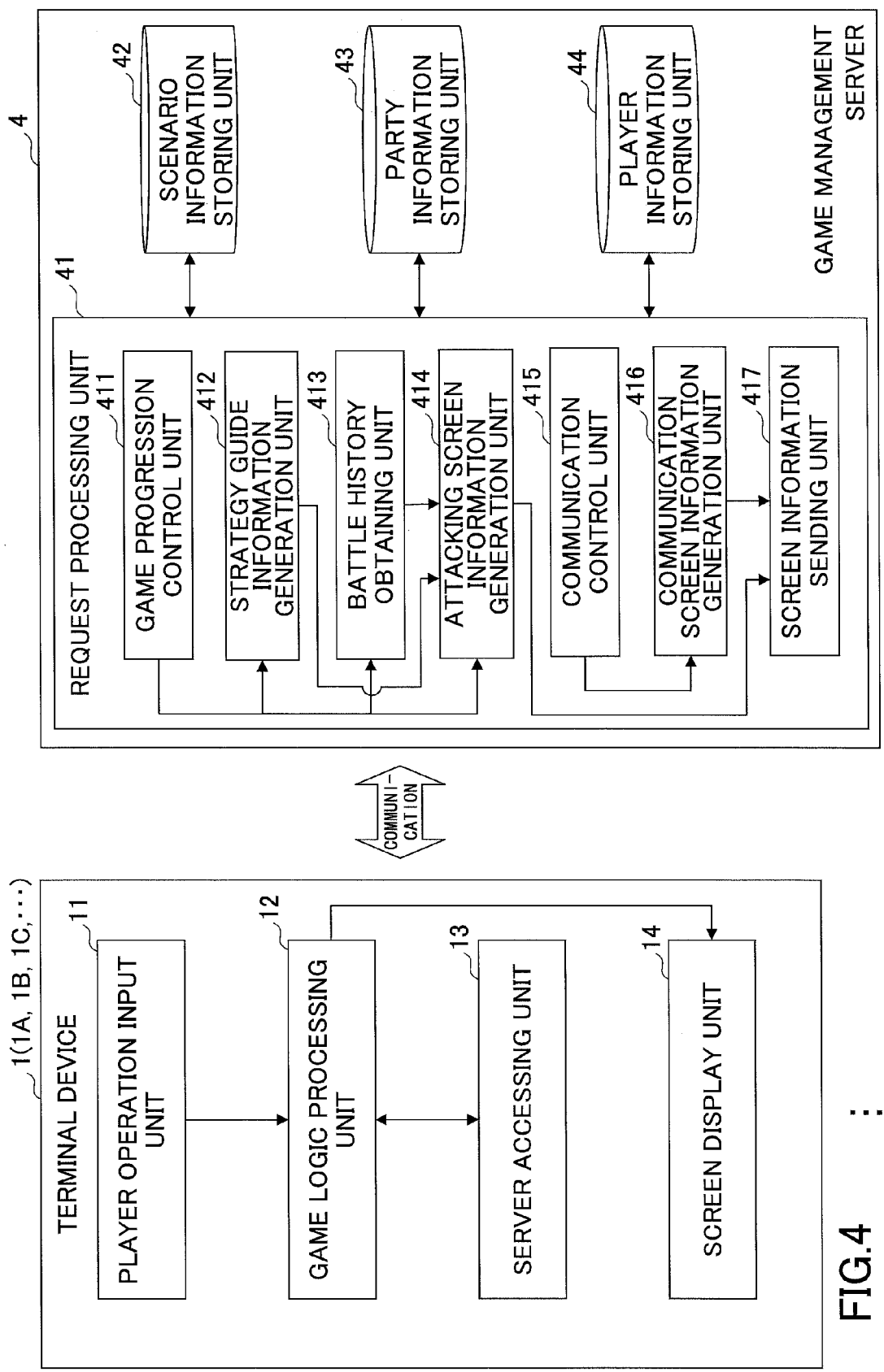
FIG. 4 is a view illustrating an example of functional structures of the terminal device and the game management server.

FIG. 4 is a view illustrating an example of functional structures of the terminal device 1 (1A, 1B, 1C, . . . ) and the game management server 4.

In FIG. 4, the terminal device 1 includes a player operation input unit 11, a game logic processing unit 12, a server accessing unit 13 and a screen display unit 14.

The player operation input unit 11 has a function to input (accept) an operation of a player that operates the terminal device 1.

The game logic processing unit 12 has a function to process a game by transitioning screens in accordance with an input operation of the player input by the player operation input unit 11. The game logic processing unit 12 has a case in which a game logic is processed based on page data described in an HTML (Hyper Text Markup Language) or the like from the game management server 4 and scripts or the like included in the page data (which is called as a browser type) and a case in which the game logic is processed based on an application that is previously downloaded and installed in the terminal device 1 (which is called as an application type).

The server accessing unit 13 has a function to send a request to the game management server 4 and receives a processed result or the like as a response from the game management server 4 when it is necessary to access the game management server 4 in a course of the processing by the game logic processing unit 12. Here, the request includes a updating request and a data referring request. The updating request is to update player information or the like. The data referring request is to refer to the player information or the like. The response from the game management server 4 includes screen information for displaying screens at the terminal device 1 side.

The screen display unit 14 has a function to display screens under control of the game logic processing unit 12.

Meanwhile, the game management server 4 includes a request processing unit 41, a scenario information storing unit 42, a party information storing unit 43 and a player information storing unit 44. The request processing unit 41 includes a game progression control unit 411, a strategy guide information generation unit 412, a battle history obtaining unit 413, an attacking screen information generation unit 414, a communication control unit 415, a communication screen information generation unit 416 and a screen information sending unit 417.

The request processing unit 41 has a function to receive a request from the terminal device 1, perform a corresponding process and send a processed result of the request to the terminal device 1. For the updating request, the request processing unit 41 performs a process including updating the player information or the like, and the processed result is the player information or the like changed by the process. For the data referring request, the request processing unit 41 refers to the corresponding player information or the like, and the processed result is a value of the obtained player information or the like. Further, for the browser type, the response includes screen information for directly displaying a screen that can be a next operation target by the player, in addition to the requested processed result. Even for the application type, information used for displaying screens at the terminal device 1 side is referred to as screen information.

The scenario information storing unit 42 stores scenario information that defines progression of the game. Here, the scenario information may include only definition information without a limitation of format, or may be integrally structured with a program of the game progression control unit 411.

FIG. 5 is a view illustrating an example of a data structure of the scenario information stored in the scenario information storing unit 42. The scenario information includes an event condition including elements such as a status (a degree of game progression of a player or a party, which is a group (a team) of the player), time zone, party attribution or the like, and an event content for the case when the event condition is satisfied including elements such as screen display condition/display content, parameter updating condition/updating content or the like.

Referring back to FIG. 4, the party information storing unit 43 stores party information. In this embodiment, a case is assumed in which parties battle (oppose) with each other. Here, there is a case that the opponent of the battle is a boss (boss character) controlled by the system. The party can go up to a higher stage (ranking) by performing and winning battles.

FIG. 6 is a view illustrating an example of a data structure of the party information stored in the party information storing unit 43. The party information includes party ID, party name, obtained points, combo number, last combo date/time, last combo player ID and log data.

The party ID is data to identify a party. The party name is the name of the party. The obtained points are points obtained by the party. Whether the battle is won is determined by the obtained points when the limited time of the battle ends. Here, the combo number is the number of the last consecutive combo where players who belong to the party cooperate with each other to form a combo. The last combo date/time is date and time when the last combo is formed. The last combo player ID is data for identifying a player who made an attack when the last combo is formed. The log data is history information of plays (mainly battles) performed by the players who belong to the party. The log data includes player ID, date/time, attacking type, opposing party ID and damage. The log data may be separately stored in corresponded with the party ID or the player ID.

Referring back to FIG. 4, the player information storing unit 44 stores information of players who participate in the game.

Figure 7:
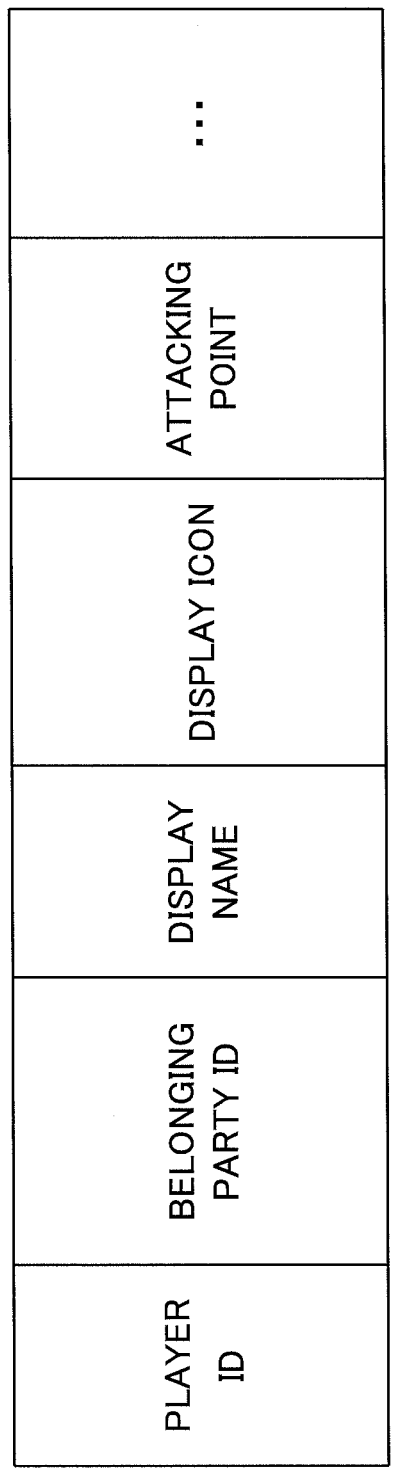
FIG. 7 is a view illustrating an example of a data structure of player information.

FIG. 7 is a view illustrating an example of a data structure of the player information stored in the player information storing unit 44. The player information includes player ID, belonging party ID, display name, display icon and attacking points.

The player ID is data to identify a player. The belonging party ID is data to identify the party to which the player belongs. The display name is display name of the player. The display icon is image data for symbolically displaying the player. The attacking points are necessary when the player makes an attack and are consumed by making the attack. When all of the attacking points are consumed, the player cannot attack anymore. By designing the game that the attacking points are necessary for attacking, the number of attacking times can be limited and it is expected that the players make much account of communications in order to carefully make attacking. However, for another game design, attacking may be made without a need of attacking points. A damage caused to the opposing party by the attacking is determined by attacking/defending parameters or the like of the attacking side/opposing side.

Referring back to FIG. 4, the game progression control unit 411 of the request processing unit 41 of the game management server 4 has a function to progress a game in response to the request from the terminal device 1 based on the scenario information (the scenario information storing unit 42), the party information (the party information storing unit 43) and the player information (the player information storing unit 44).

Further, the game progression control unit 411 also has a function to determine whether a combo is formed. When another attack by another player in the same party is made within a predetermined period (10 minutes, for example) from an attack by a player in a party is made, it is determined that a combo is formed. When the same player makes attacks or the predetermined period has passed, the combo is not formed. Whether the combo is formed is determined from the player ID of the player who made the attack, the party ID, the current date/time, and the party ID, the combo number, the last combo date/time and the last combo player ID of the party information (FIG. 6).

Further, the game progression control unit 411 has a function to terminate (blind), when a command of activating a blind function (blin function) is performed by a player of a party, display of strategy guide information, which will be explained later, and the battle history to all of the players of the opposing party for a predetermined period (5 minutes, 10 minutes, until game end or the like, for example) within which the blind function is effective. Display of a point gauge to the opposing party may be terminated.

For terminating display, those information are not included in screen information, or an image processing is performed so that those information cannot be read. Here, it is assumed that display of the additionally provided (fed) strategy guide information and the battle history in accordance with the game progression are terminated and display of an image or the like showing a formation of a combo or the like, which is displayed in an original game screen is not terminated. However, in order to perfectly effect the blind function, information regarding the strategy guide information and the battle history may be removed from all of the game screens.

Under control of the game progression control unit 411, the strategy guide information generation unit 412 has a function to generate strategy guide information for advantageously proceeding in the game, for presenting the players, based on the scenario information, the party information and the player information. The strategy guide information is, in particular, content notifying attacking timing for each of the players to form a combo. The strategy guide information is, for example, content such as "5 SUCCESSIVE ATTACKING COMBOS! ATTACKING POWER 30% UP! CHANCE!". The strategy guide information is generated by predicting a combo capable of being formed based on the player ID of a player to be provided, the party ID, the current date/time, and the party ID, the combo number, the last combo date/time and the last combo player ID of the party information (FIG. 6) and combining with a previously prepared message.

Under control of the game progression control unit 411, the battle history obtaining unit 413 has a function to obtain a battle history (play history) of each of the players of the both of the parties having a battle for presenting the players based on the party information and the player information. The battle history includes display icons (attacking side and attacked side), display name (attacking side), attacking date/time and attacking content. More specifically, the battle history obtaining unit 413 generates the battle history from the log data of the party information (FIG. 6) and the player information (FIG. 7).

Under control of the game progression control unit 411, the attacking screen information generation unit 414 has a function to generate attacking screen information based on original game screen information (including a case with voice information) for a game progression, the strategy guide information generated by the strategy guide information generation unit 412 and the battle history obtained by the battle history obtaining unit 413.

The communication control unit 415 has a function to control sending and receiving communication information in a free format such as a so-called chats or the like between players in the same party.

Under control of the communication control unit 415, the communication screen information generation unit 416 has a function to generate communication screen information for sending and receiving chats. In order to simplify an input operation of a message to send, sample sentences or the like may be displayed in a selectable manner to have the players select a desired one or change a part.

The screen information sending unit 417 has a function to send the attacking screen information generated by the attacking screen information generation unit 414 and the communication screen information generated by the communication screen information generation unit 416 to the terminal device 1.

(Operation)

Figure 8:
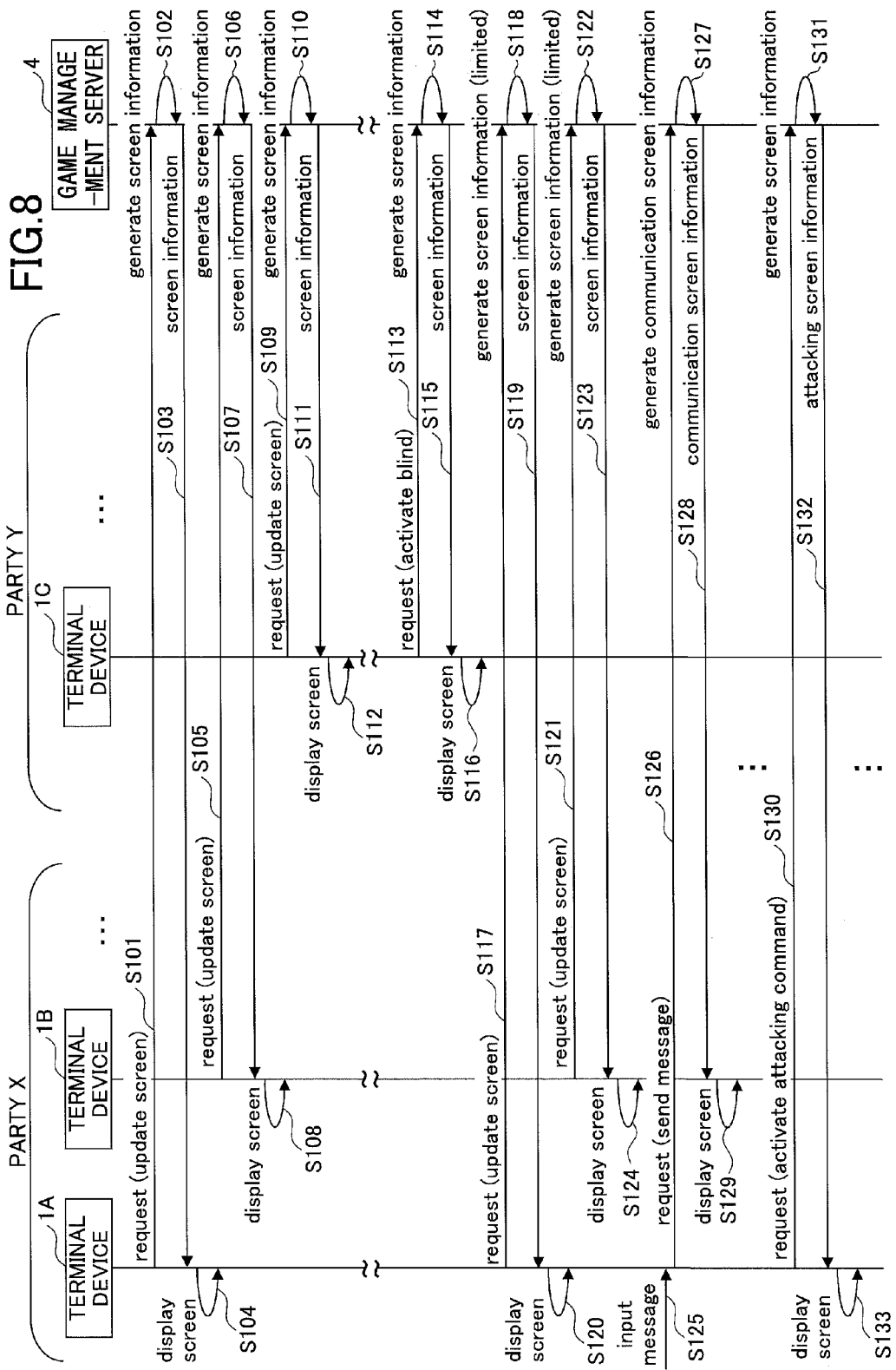
FIG. 8 is a sequence diagram illustrating an example of a process of the embodiment.

FIG. 8 is a sequence diagram illustrating an example of a process of the embodiment.

In FIG. 8, it is assumed that a player of the terminal device 1A and a player of the terminal device 1B belong to a party X while a player of the terminal device 10 belongs to a party Y.

At a normal state (at a state that the blind function is not activated), when a updating request of a screen is sent from the terminal device 1A, 1B or 1C (including a case operated by a player and a periodically performed case) to the game management server 4 (step S101, S105 or S109), the request processing unit 41 of the game management server 4 generates screen information normally including strategy guide information and a battle history (step S102, S106 or S110), and returns back to the requested terminal device 1A, 1B or 1C (step S103, S107 or S111) to be displayed (step S104, S108 or S112).

Here, although it is assumed that a so-called pull-type is performed in which the terminal device 1A, 1B or 1C obtains up-to-date screen information, a so-called push type may be performed in which the game management server 4 sends up-to-date screen information to the terminal device 1A, 1B or 1C.

Figure 9:
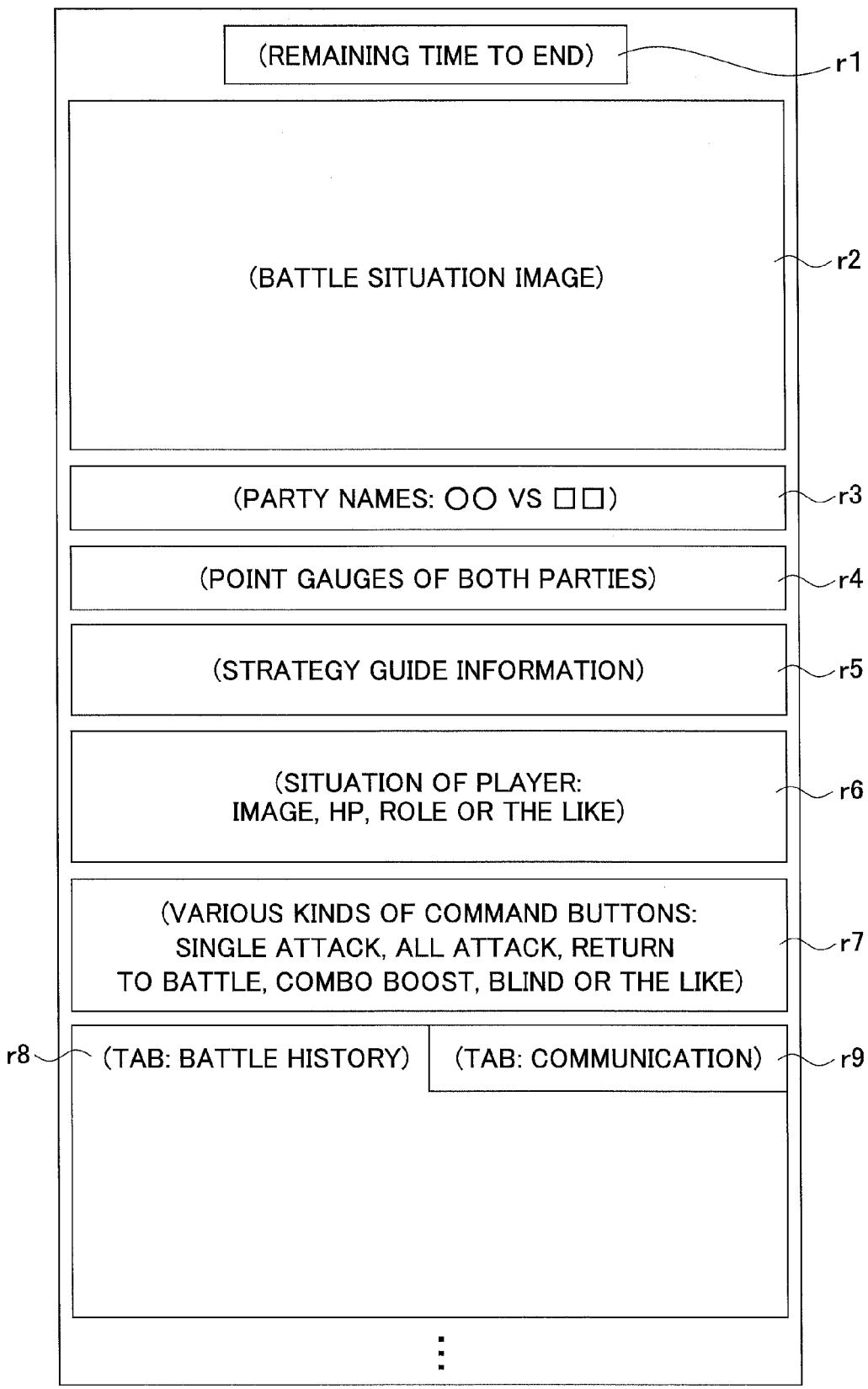
FIG. 9 is a view illustrating an example of a screen displayed on the terminal device.

FIG. 9 is a view illustrating an example of a screen displayed on the terminal device 1. Remaining time to the end is displayed in a region r1, a battle situation image is displayed in a region r2, party names are displayed in a region r3, point gauges of the parties are displayed in a region r4, and strategy guide information is displayed in a region r5. By displaying the remaining time, it is expected that the players are motivated to make the battle situation good earlier so that the communications in the party are activated. At this time, it is expected that the players can rapidly have communications with each other compared with a case using an external bulletin board or the like and use of a communication screen in the same screen is promoted.

Further, a situation of the player is displayed in a region r6, and various kinds of command buttons are displayed in a region r7. The various kinds of command buttons include a button for activating combo boost that increases an attacking effect when being activated when a combo is formed and a button for activating a blind function by which display of the strategy guide information and the battle history to all of the players who belong to the opposing party is blinded, in addition to buttons for activating various kinds of attacking. These command buttons include one that can be activated at any time provided that an item or the like to activate the command is possessed, and further, one that can be activated only when timing, player attribution or a parameter condition is satisfied.

Further, among a region r8 and a region r9 capable of switching by tabs, a battle history is displayed in the region r8 and a communication screen for inputting and outputting chat or the like for having communications is displayed in the region r9.

Referring back to FIG. 8, thereafter, for example, when the player of the terminal device 1C who belongs to the party Y operates to activate a blind function, and the request is sent to the game management server 4 (step S113), the game management server 4 generates up-to-date screen information (step S114) and returns it to the terminal device 1C (step S115) to be displayed (step S116). The screen information at this time is the same as a normal one.

On the other hand, when a request to update a screen is sent to the game management server 4 from the terminal device 1A or 1B of the player who belongs to the party X, to which the blind function is set (step S117 or S121), the request processing unit 41 of the game management server 4 generates screen information in which display of the strategy guide information and the battle history is terminated (step S118 or S122) and returns it to the requested terminal device 1A or 1B (step S119 or S123) to be displayed (step S120 or S124). Specifically, referring to the example of the screen illustrated in FIG. 9, information of the strategy guide information in the region r5 and the battle history in the region r8 are not included in a display screen or a screen in which those information are processed to be unable to be read is displayed.

Referring back to FIG. 8, the player of the party X for which information is limited has to use a communication function because the player cannot obtain information to form a combo. Further, players previously often use the communication function anticipating and preventing the activation of the blind function.

When the player of the terminal device 1A who belongs to the party X inputs a message in the communication screen (step S125), a request to send the message is sent to the game management server 4 (step S126). Then, the game management server 4 generates communication screen information including the received message (step S127) and sends it to the terminal device 1B of the player who belongs to the same party X (step S128) to be displayed (step S129). Here, it is assumed that the message is delivered by a so-called push type so that the message can reach soon, however, the message may be obtained by the terminal device 1B from the game management server 4 by a pull type.

Thereafter, when the player of the terminal device 1A who belongs to the party X operates to activate an attacking command and the request is sent to the game management server 4 (step S130), the request processing unit 41 of the game management server 4 generates screen information in which the attack including formation of a combo is reflected (step S131) and returns it to the terminal device 1A (step S132) to be displayed (step S133).

FIG. 10 is a view illustrating an example of communications performed between players. It is expected that various messages are sent and received before the battle, during the battle and after the battle and communications between players can be activated.

As explained above, according to the embodiment, players are motivated to promptly have communications with each others and communications between players can be activated.

In this embodiment, players are motivated to promptly have communications with each others and communications between players can be activated.

Although a preferred embodiment of the invention has been specifically illustrated and described, it is to be understood that minor modifications may be made therein without departing from the spirit and scope of the invention as defined by the claims. The present invention is not limited to the specifically disclosed embodiments.

What is claimed is:

1. A game management server apparatus that provides a game to a plurality of terminal devices connected via a network, comprising:
a party information storing unit that stores party information of a plurality of parties each including a plurality of players operating the terminal devices and cooperating with each other to battle against another party as an opposing enemy in the game;
a battle history storing unit that stores a battle history of each of the plurality of players;
a generating unit that generates strategy guide information including attacking timing for each of the players to form a combo by the players in the same party;
an attacking screen information generating unit that
generates information of a normal attacking screen that includes a battle situation image, the battle history and the strategy guide information at a normal state for each of the players, and
generates information of a limited attacking screen that includes the battle situation image when a blind function is activated by the opposing enemy in the game, the battle history and the strategy guide information being not included in the limited attacking screen or being made not to be read in the limited attacking screen;
a communication screen information generating unit that generates communication screen information for a plurality of players in the same party to have communication with each other; and
a screen information sending unit that sends the information of the normal attacking screen or the information of the limited attacking screen generated by the attacking screen information generating unit, and the communication screen information generated by the communication screen information generating unit, to the terminal devices.

2. The game management server apparatus according to claim 1,
wherein the predetermined condition is that a blind function is activated, the blind function limiting information to a player who belongs to an opposing party in the battle.

3. The game management server apparatus according to claim 1, wherein the battle is provided with limited time.

4. The game management server apparatus according to claim 1, wherein the strategy guide information indicates a timing at which the player is to activate an attacking.

5. The game management server apparatus according to claim 1, wherein the battle history indicates an event that another player performs an attacking.

6. The game management server apparatus according to claim 1, wherein an attacking effect is increased when ally players successively attack.

7. A non-transitory computer-readable recording medium having recorded thereon a program for a game management server apparatus that causes a computer composing the game management server apparatus that provides a game to a plurality of terminal devices connected via a network, to execute functions comprising:
- a party information storing function that stores party information of a plurality of parties each including a plurality of players operating the terminal devices and cooperating with each other to battle against another party as an opposing enemy in the game;
- a battle history storing function that stores a battle history of each of the plurality of players;
- a generating function that generates strategy guide information including attacking timing for each of the players to form a combo by the players in the same party;
- an attacking screen information generating function that
  - generates information of a normal attacking screen that includes a battle situation image, the battle history and the strategy guide information at a normal state for each of the players, and
  - generates information of a limited attacking screen that includes the battle situation image when a blind function is activated by the opposing enemy in the game, the battle history and the strategy guide information being not included in the limited attacking screen or being made not to be read in the limited attacking screen;
- a communication screen information generating function that generates communication screen information for a plurality of players in the same party to have communication with each other; and
- a screen information sending function that sends the information of the normal attacking screen or the information of the limited attacking screen generated by the attacking screen information generating function, and the communication screen information generated by the communication screen information generating function, to the terminal devices.

* * * * *